Patented Nov. 30, 1926.

1,608,737

UNITED STATES PATENT OFFICE.

EDWARD WILLIAM HARVEY, OF NEW BRUNSWICK, NEW JERSEY.

AMMONIUM SALT.    REISSUED

No Drawing. Application filed August 16, 1922, Serial No. 582,134. Renewed October 5, 1925.

My invention relates to drying and improving the physical condition of ammonium salts by lowering the percentage of free acid and free moisture contained therein.

In the production of ammonium sulfate by the usual processes, as for example as a by-product from illuminating gas manufacture and coke works, or when ammonia has been obtained directly from the air synthetically, it has been customary to pass the gases containing ammonia through a saturator bath of sulfuric acid solution whereupon the ammonium sulfate is formed and is precipitated when the concentration reaches the proper amount. These crystals are collected and the surplus liquor is drained off or removed in the centrifugal. Some of the acid mother liquor clings to the surfaces of the crystals. The bulk of the moisture can be removed without great difficulty, but even a very small residue of the same is objectionable. The removal of these last small amounts of acid and water is very difficult. Ammonium sulfate in such a condition, containing some free acid and free moisture, is difficult to handle, ship and use because of its poor physical condition and the tendency of the free acid to retain and absorb moisture and to destroy the fiber of the bags in which it may be contained.

By my invention much or all of the free acid of the ammonium sulfate is neutralized, or a sulfate is formed therefrom, and much or all of the free moisture of the ammonium sulfate is changed from the free state to a chemically combined state by the addition of one or more materials for this purpose. It is preferable to add a material which is itself a fertilizer and which will at the same time overcome the deleterious properties of the impure ammonium sulfate.

In practicing this invention I may add to the ammonium sulfate as usually prepared a mixture of hemi-hydrate of calcium sulfate $(CaSO_4)_2.H_2O$, calcium oxide (CaO), calcium hydroxide $[Ca(OH)_2]$, and calcium carbonate $(CaCO_3)$, or I may add one or more of these in suitable proportion, or I may add a suitable commercial product containing among its several ingredients hemi-hydrate of calcium sulfate and a basic material or materials, as calcium oxide or calcium hydroxide, such a commercial product being commonly known as "stucco" or plaster of Paris. All of the above materials used as additions are to be added in a finely divided or powdered state. The action of such additions to ammonium sulfate has the following effect.

First, the bases neutralize the free acid and absorb some moisture, according to the formulæ—

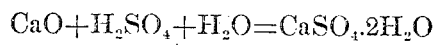
$$CaO + H_2SO_4 + H_2O = CaSO_4.2H_2O$$

or

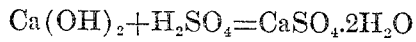
$$Ca(OH)_2 + H_2SO_4 = CaSO_4.2H_2O$$
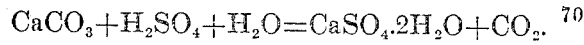
$$CaCO_3 + H_2SO_4 + H_2O = CaSO_4.2H_2O + CO_2.$$

Second, the hemi-hydrate of calcium sulfate $(CaSO_4)_2.H_2O$ dries the mixture by combining with the free moisture contained in the mixture, in accordance with the following formula—

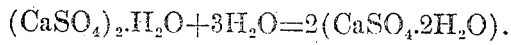
$$(CaSO_4)_2.H_2O + 3H_2O = 2(CaSO_4.2H_2O).$$

The relative proportion of base to hemi-hydrate of calcium sulfate and the amount of such mixture necessary to dry a given amount of ammonium sulfate will depend upon the amount of free acid and free moisture in the ammonium sulfate to be so dried and neutralized, and said proportions and amounts can be determined by chemical analysis and formula. The amounts used should not be large enough to cause decomposition of an appreciable amount of ammonium sulfate with consequent loss of ammonia. The amount in said mixture may vary from a fraction of 1 per cent to 10 per cent of the ammonium sulfate to be treated, depending upon the amount of free sulfuric acid and free water in the ammonium sulfate.

Ammonium sulfate treated as above described has been found to be greatly benefited as to physical condition after such treatment and is much more satisfactory. The ammonium sulfate may be mixed with the finely divided material in any convenient way or the material may be blown or otherwise applied as a dust over the ammonium sulfate crystals, as the crystals are agitated or the mass is rolled, or the mixture of the ammonium sulfate and the material to be added may be effected in any other convenient way.

While the invention has been specifically described in connection with ammonium sulfate, it is also applicable to the treatment of ammonium chloride for the purpose of improving its physical condition and producing a more desirable product.

I claim—

1. The process of improving the condition of commercial ammonium sulfate, which comprises adding thereto a mixture comprising a material containing a basic calcium compound, and hemi-hydrate of calcium sulfate.

2. The process of improving the condition of commercial ammonium sulfate, which comprises adding plaster of Paris thereto.

3. The process of improving the condition of commercial ammonium sulfate, which comprises adding thereto a finely divided basic material mixed with hemi-hydrate of calcium sulfate.

4. The process of improving the condition of commercial ammonium sulfate, which comprises adding thereto a mixture containing hemi-hydrate of calcium sulfate and a basic material in amount insufficient to decompose an appreciable quantity of the ammonium sulfate.

5. The process of drying and improving the physical condition of ammonium sulfate which comprises adding thereto a material containing powdered plaster of Paris.

6. The process of drying, neutralizing and improving the physical condition of ammonium sulfate which comprises adding thereto a material containing powdered hemi-hydrate of calcium sulfate and basic material.

7. The process set forth in claim 5, in which the material is added to the ammonium sulfate by blowing it thereon.

8. The process set forth in claim 6, in which the material is added to the ammonium sulfate by blowing it thereon.

In testimony whereof I hereto affix my signature.

EDWARD WILLIAM HARVEY.